United States Patent
Ryu et al.

(10) Patent No.: US 11,128,366 B2
(45) Date of Patent: Sep. 21, 2021

(54) TRIGGERED SIDELINK QUASI-COLOCATION PARAMETER UPDATE

(71) Applicant: QUALCOMM Incorporated, San Diego, CA (US)

(72) Inventors: Jung Ho Ryu, Fort Lee, NJ (US); Tao Luo, San Diego, CA (US); Junyi Li, Chester, NJ (US); Sony Akkarakaran, Poway, CA (US)

(*) Notice: Subject to any disclaimer, the term of this patent is extended or adjusted under 35 U.S.C. 154(b) by 0 days.

(21) Appl. No.: 16/898,356

(22) Filed: Jun. 10, 2020

(65) Prior Publication Data

US 2020/0395993 A1 Dec. 17, 2020

Related U.S. Application Data

(60) Provisional application No. 62/862,567, filed on Jun. 17, 2019.

(51) Int. Cl.
| | |
|---|---|
| H04B 7/06 | (2006.01) |
| H04B 7/08 | (2006.01) |
| H04B 7/0417 | (2017.01) |
| H04W 64/00 | (2009.01) |
| H04W 72/04 | (2009.01) |
| H04W 92/18 | (2009.01) |

(52) U.S. Cl.
CPC ......... *H04B 7/0695* (2013.01); *H04B 7/0417* (2013.01); *H04B 7/088* (2013.01); *H04W 64/00* (2013.01); *H04W 72/0413* (2013.01); *H04M 2250/12* (2013.01); *H04W 92/18* (2013.01)

(58) Field of Classification Search
CPC ........... H04L 1/0618; H04L 1/06; H04L 1/00; H04B 7/0417; H04B 7/0695; H04B 7/0834; H04B 7/0617; H04W 72/0413; H04W 72/1284
USPC ................................................. 375/267, 260
See application file for complete search history.

(56) References Cited

U.S. PATENT DOCUMENTS

| | | | |
|---|---|---|---|
| 2018/0191422 A1* | 7/2018 | Xia | H04B 7/0834 |
| 2018/0278319 A1* | 9/2018 | Cezanne | H04B 7/0695 |
| 2019/0158162 A1 | 5/2019 | Ryu et al. | |
| 2020/0304253 A1* | 9/2020 | Choi | H04L 5/0053 |
| 2020/0322812 A1* | 10/2020 | Shi | H04W 16/28 |
| 2020/0358515 A1* | 11/2020 | Li | H04B 17/318 |

OTHER PUBLICATIONS

International Search Report and Written Opinion—PCT/US2020/037234—ISA/EPO—dated Oct. 1, 2020.

* cited by examiner

*Primary Examiner* — Khai Tran

(57) ABSTRACT

Various aspects of the present disclosure generally relate to wireless communication. In some aspects, a user equipment (UE) may detect that a trigger condition is satisfied based at least in part on a motion sensor signal of the UE. The UE may trigger or transmit an update to a parameter for sidelink beam management based at least in part on the trigger condition being satisfied, wherein the UE is a transmitter of a synchronization signal used for the sidelink beam management, or a receiver of the synchronization signal transmitted by another UE used for the sidelink beam management. Numerous other aspects are provided.

30 Claims, 9 Drawing Sheets

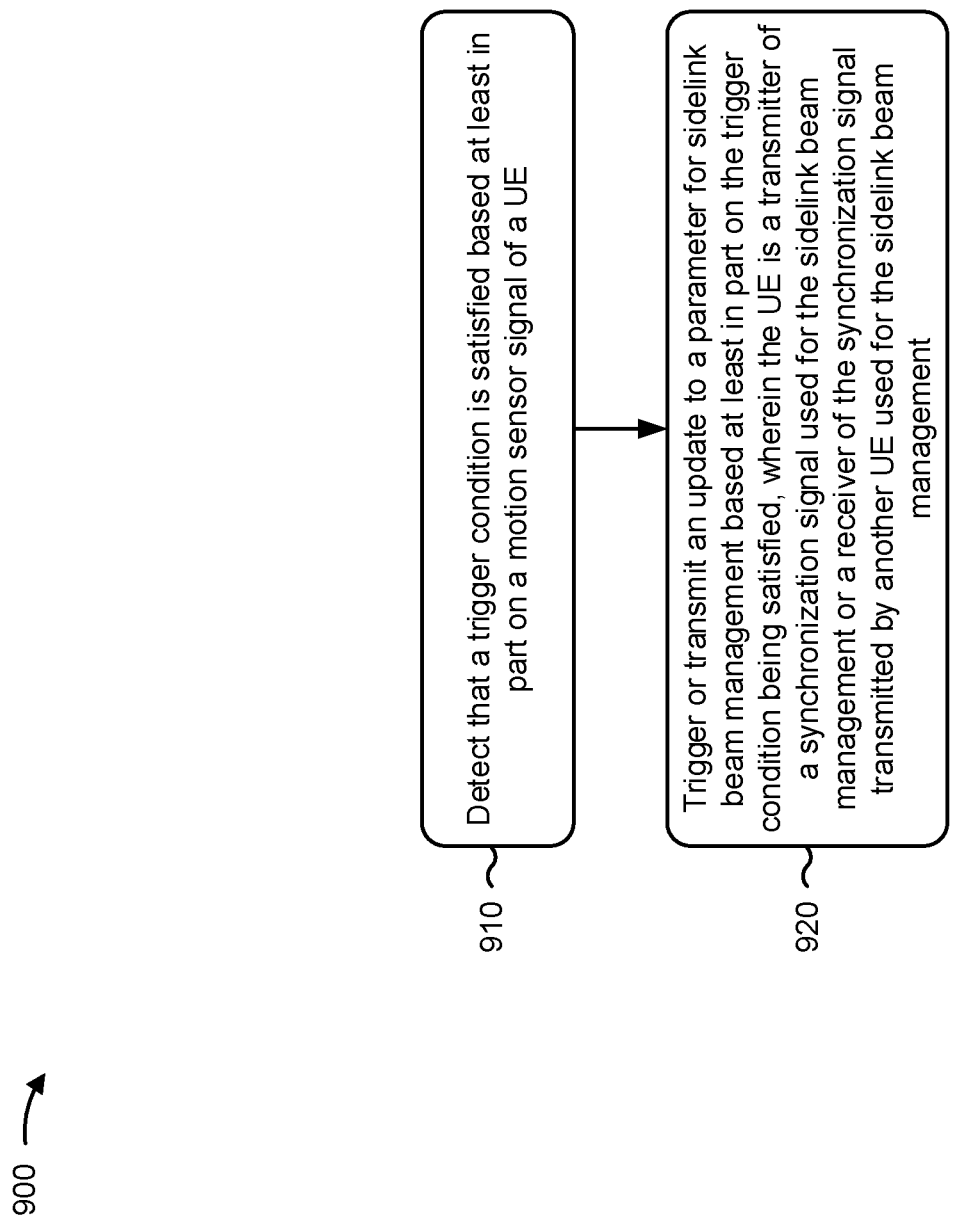

TRIGGERED SIDELINK QUASI-COLOCATION PARAMETER UPDATE

CROSS-REFERENCE TO RELATED APPLICATION

This patent application claims priority to Provisional Patent Application No. 62/862,567, filed on Jun. 17, 2019, entitled "TRIGGERED SIDELINK QUASI-COLOCATION PARAMETER UPDATE," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for a triggered sidelink quasi-colocation (QCL) parameter update.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies continue to be useful. Preferably, these improvements should be applicable to other multiple access technologies and the telecommunication standards that employ these technologies.

SUMMARY

In some aspects, a method of wireless communication, performed by a UE, may include detecting that a trigger condition is satisfied based at least in part on a motion sensor signal of the UE; and triggering or transmitting an update to a parameter for sidelink beam management based at least in part on the trigger condition being satisfied, wherein the UE is a transmitter of a synchronization signal used for the sidelink beam management, or a receiver of the synchronization signal transmitted by another UE used for the sidelink beam management.

In some aspects, a method of wireless communication, performed by a base station, may include detecting that a trigger condition is satisfied based at least in part on a motion sensor signal of a UE; and triggering or transmitting an update to a parameter for sidelink beam management based at least in part on the trigger condition being satisfied, wherein the UE is a transmitter of a synchronization signal used for the sidelink beam management, or a receiver of the synchronization signal transmitted by another UE used for the sidelink beam management.

In some aspects, a UE for wireless communication may include memory and one or more processors operatively coupled to the memory. The memory and the one or more processors may be configured to detect that a trigger condition is satisfied based at least in part on a motion sensor signal of the UE; and trigger or transmit an update to a parameter for sidelink beam management based at least in part on the trigger condition being satisfied, wherein the UE is a transmitter of a synchronization signal used for the sidelink beam management, or a receiver of the synchronization signal transmitted by another UE used for the sidelink beam management.

In some aspects, a base station for wireless communication may include memory and one or more processors operatively coupled to the memory. The memory and the one or more processors may be configured to detect that a trigger condition is satisfied based at least in part on a motion sensor signal of a user equipment (UE); and trigger or transmit an update to a parameter for sidelink beam management based at least in part on the trigger condition being satisfied, wherein the UE is a transmitter of a synchronization signal used for the sidelink beam management, or a receiver of the synchronization signal transmitted by another UE used for the sidelink beam management.

In some aspects, a non-transitory computer-readable medium may store one or more instructions for wireless communication. The one or more instructions, when executed by one or more processors of a base station, may cause the one or more processors to: detect that a trigger condition is satisfied based at least in part on a motion sensor signal of the UE; and trigger or transmit an update to a parameter for sidelink beam management based at least in part on the trigger condition being satisfied, wherein the UE is a transmitter of a synchronization signal used for the sidelink beam management, or a receiver of the synchronization signal transmitted by another UE used for the sidelink beam management.

In some aspects, a non-transitory computer-readable medium may store one or more instructions for wireless communication. The one or more instructions, when executed by one or more processors of a base station, may cause the one or more processors to: detect that a trigger condition is satisfied based at least in part on a motion sensor signal of a UE; and trigger or transmit an update to a parameter for sidelink beam management based at least in part on the trigger condition being satisfied, wherein the UE is a transmitter of a synchronization signal used for the sidelink beam management, or a receiver of the synchronization signal transmitted by another UE used for the sidelink beam management.

In some aspects, an apparatus for wireless communication may include means for detecting that a trigger condition is satisfied based at least in part on a motion sensor signal of the apparatus; and means for triggering or transmitting an update to a parameter for sidelink beam management based at least in part on the trigger condition being satisfied, wherein the apparatus is a transmitter of a synchronization signal used for the sidelink beam management, or a receiver of the synchronization signal transmitted by another UE used for the sidelink beam management.

In some aspects, an apparatus for wireless communication may include means for detecting that a trigger condition is satisfied based at least in part on a motion sensor signal of a UE; and means for triggering or transmitting an update to a parameter for sidelink beam management based at least in part on the trigger condition being satisfied, wherein the UE is a transmitter of a synchronization signal used for the sidelink beam management, or a receiver of the synchronization signal transmitted by another UE used for the sidelink beam management.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
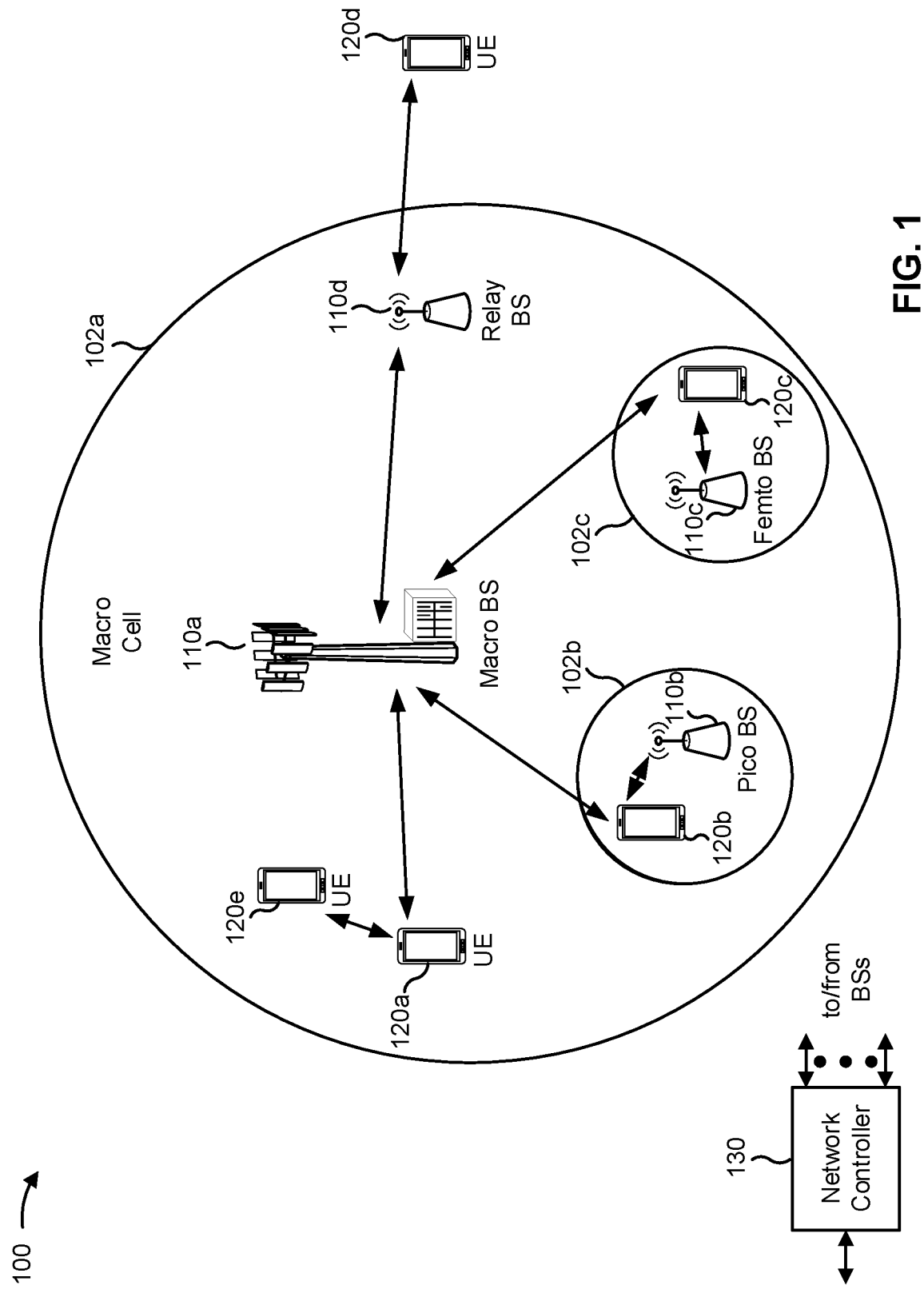
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. Additionally or alternatively, one or both of UE 120a and 120e may perform sidelink beam management as described elsewhere herein in support of above mentioned sidelink channels used for direct communications.

As indicated above, FIG. 1 is provided as an example. Other examples may differ from what is described with regard to FIG. 1.

Figure 2:
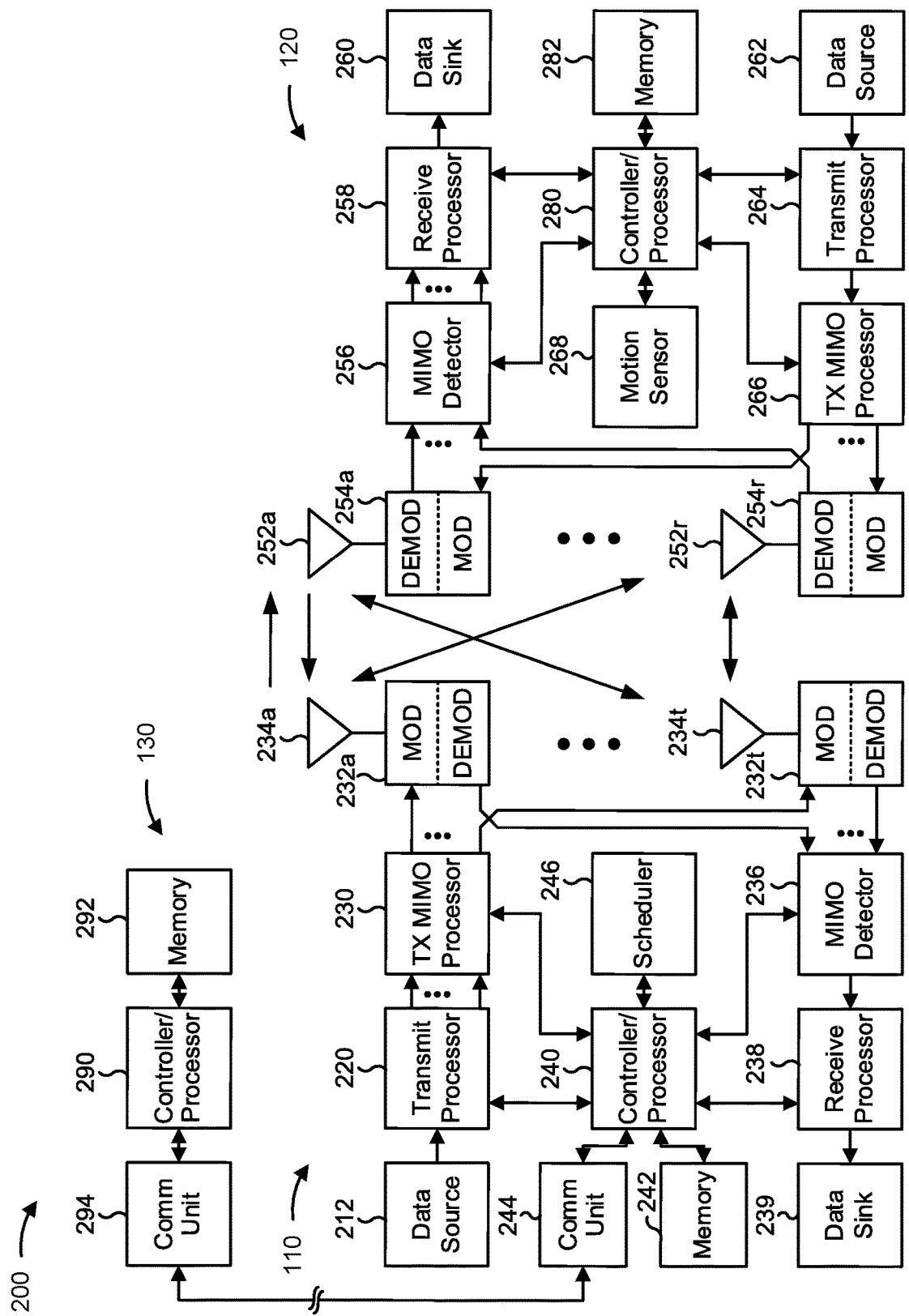
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing. UE 120 may include a motion sensor 268, which may provide a motion sensor signal based at least in part on a position or movement of UE 120. For example, the motion sensor 268 may include a gyroscope, an accelerometer, a global positioning system (GPS) unit, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a triggered sidelink quasi-colocation parameter update, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for detecting that a trigger condition is satisfied based at least in part on a motion sensor signal of the UE 120, means for triggering or transmitting an update to a parameter for sidelink beam management based at least in part on the trigger condition being satisfied, wherein the UE is a transmitter of a synchronization signal used for the sidelink beam management, or a receiver of the synchronization signal transmitted by another UE used for the sidelink beam management, means for transmitting the update to the parameter to one or more other UEs associated with a sidelink connection with the UE 120, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for detecting that a trigger condition is satisfied based at least in part on a motion sensor signal of a UE, means for triggering or transmitting an update to a parameter for sidelink beam management based at least in part on the trigger condition being satisfied, wherein the UE is a transmitter of a synchronization signal used for the sidelink beam management, or a receiver of the synchronization signal transmitted by another UE used for the sidelink beam management, means for triggering or transmitting the update to the parameter to one or more other UEs associated with a sidelink connection with the UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Some radio access technologies (RATs), such as 5G/NR, may provide for sidelink communication between UEs. Sidelink communications may refer to communications that do not use a base station as an intermediary for UE-to-UE or UE-to-wireless-node communication. UEs may perform sidelink communication using beams to improve wireless communication performance. For example, a UE may generate a transmit/receive beam to transmit/receive a transmission based at least in part on a quasi-colocation (QCL) state or a QCL type. One QCL type is QCL Type D, which may define a spatial filter for a transmit/receive beam of a UE. Sidelink communications may be useful for UE-to-UE communication for gaming, augmented reality, virtual reality, drone-to-drone communications, vehicle-to-anything (V2X), integrated access and backhaul (IAB), and/or the like, particularly in higher frequency bands in which omnidirectional transmission may be prohibitively power-intensive.

Figure 3:
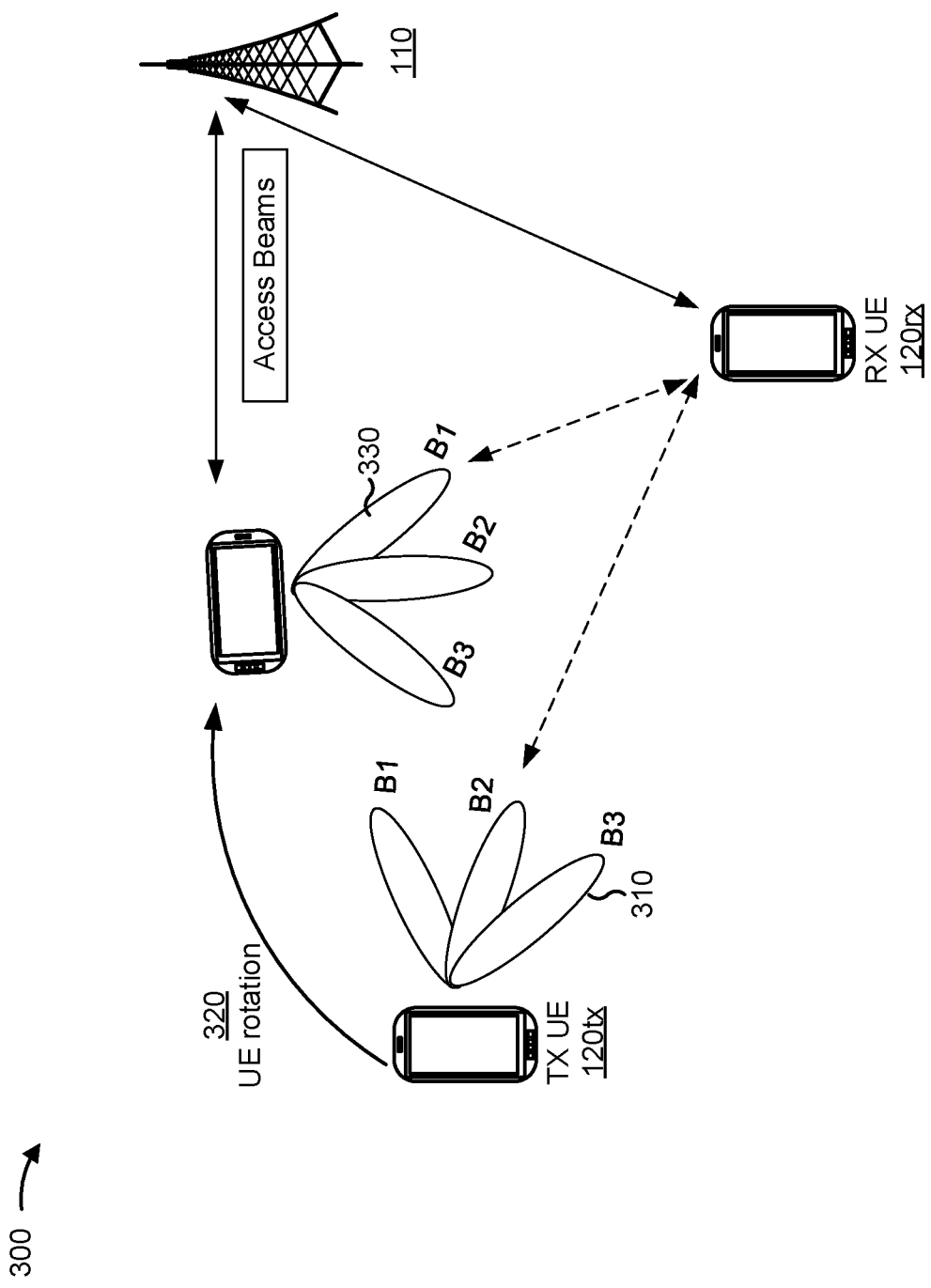
FIG. 3 is a diagram illustrating an example of a sidelink beam interruption in accordance with various aspects of the present disclosure.

The beams used for UE-to-UE communication may change more frequently than the beams that a UE uses to communicate with a stationary entity, such as a base station. When the base station is stationary, the base station's beams may tend to point in the same direction and may cover the same region relative to the base station's orientation. However, for UE-to-UE communications, even when the channel between UEs does not change, any movement by the UEs may change the QCL state used to maintain the UE-to-UE communication link. FIG. 3 depicts an example of this. To mitigate the effect of movement by UEs, a UE associated with a sidelink communication link may perform sidelink beam management, such as a QCL update, to maintain beams. The sidelink beam management is described in connection with FIG. 7. However, an inflexible approach to the sidelink beam management may not provide optimal performance and/or may be wasteful of UE resources. For example, two stationary UEs may not benefit from an aggressive beam management configuration and may use excessive resources in maintaining the aggressive beam management configuration, whereas a UE that is in motion or that frequently changes orientation may benefit from more frequent sidelink beam management.

Some techniques and apparatuses described herein provide adjustment of a sidelink beam management (e.g., QCL update) parameter based at least in part on a threshold being satisfied at a UE. For example, the threshold may be based at least in part on a motion sensor signal of the UE. In some aspects, the UE is a transmitter of a synchronization signal associated with the beam management operation. In other aspects, the UE is a receiver of a synchronization signal associated with the beam management operation. Based at least in part on the threshold being satisfied, the UE may provide an update to a parameter for sidelink beam management, or may trigger the update to the parameter (e.g., by a base station and/or the like). In some aspects, a base station may detect that the threshold is satisfied (e.g., based at least in part on motion sensor data from the UE). In some aspects, the UE may determine that a beam relationship with a base station (e.g., an access base station of the UE) has changed and may update the parameter accordingly. Thus, parameters for sidelink beam management of a UE associated with a sidelink communication link may be adjusted based at least in part on sensor data collected at the UE, which improves efficiency of sidelink beam management. In some aspects, by using motion sensor signals of the UE that transmits the synchronization signal for the sidelink beam management, delay or inaccuracy that would otherwise be caused by a different device reconfiguring the sidelink beam management may be reduced, and resources of the other device (e.g., the base station and/or the like) may be conserved.

FIG. 3 is a diagram illustrating an example 300 of a sidelink beam interruption in accordance with various aspects of the present disclosure. As shown, example 300 includes a transmit (TX) UE 120tx, a receive (RX) UE 120rx, and a base station 110. TX UE 120tx can be an example of, for example, UE 120a or 120e with reference to FIG. 1. Similarly, RX UE 120rx can be an example of, for example, UE 120a or 120e with reference to FIG. 1. TX UE 120tx is the transmitter of the synchronization signal for sidelink beam management and RX UE 120rx is the receiver of the sidelink synchronization signal. The base station 110 may provide access to a core network for the TX UE 120tx and the RX UE 120rx. In some aspects, one or more of the TX UE 120tx or the RX UE 120rx may be wireless nodes, such as integrated access and backhaul (IAB) relay nodes and/or the like.

As shown by reference number 310, the TX UE 120tx may be capable of generating beams B1, B2, and B3 for sidelink communication with the RX UE 120rx. Each beam may be associated with a QCL state, which may identify a spatial beamforming configuration or a spatial filter configuration to generate each beam. The RX UE 120rx may generate receive beams to receive a sidelink communication from the TX UE 120tx using a QCL state (not shown).

As shown by reference number 320, the TX UE 120tx may move from the initial state of example 300. For example, the TX UE 120tx may move laterally, may rotate, may change orientation, and/or the like. Thus, as shown by reference number 330, the spatial directions of beams B1, B2, and B3 may change. For example, before rotation, B2 was pointing in the general direction of east relative to the page of FIG. 3; after rotation, B2 is pointing in the general direction of south. In this case, beam B1 is better aligned with the RX UE 120rx after rotation, as opposed to beam B2. Thus, it may be beneficial for the TX UE 120tx to perform sidelink beam management to identify beam B1 as aligned with the RX UE 120rx. A sidelink beam management in which the transmitter of sidelink beam management synchronization signal proactively adjusts or updates the parameters of sidelink beam management based on the motion of the transmitter may provide an improvement in performance because such sidelink beam management prevents the beam alignment from deteriorating too much due to the motion of the transmitter. For example, in reference to FIG. 3, a slight beam misalignment due to 1° rotation of the TX UE 120tx is much easier to correct than a large beam misalignment due to 10° rotation. A baseline sidelink beam management in which an update to the beam management parameter is not triggered, at least in part, by motion of the transmitter may not trigger beam management update until it is too late, thus leading to more aggressive corrective action and increased resource consumption.

Some techniques and apparatuses described herein provide for the triggering of an update to a parameter for the sidelink beam management. For example, the parameter may include a periodicity of the sidelink beam management, a number of beams used in the sidelink beam management, a number of panels used in the sidelink beam management, a number of antenna arrays or subarrays used in the sidelink beam management, a transmit power, a waveform, a number of repetitions, and/or the like. Thus, the TX UE 120tx may adjust the sidelink beam management so that the sidelink beam management provides more efficient and/or effective sidelink beam management, as described in more detail below.

As indicated above, FIG. 3 is provided as an example. Other examples may differ from what is described with respect to FIG. 3. Furthermore, the triggering of the update to the beam management parameter may be performed by the RX UE 120rx in some examples.

Figure 4:
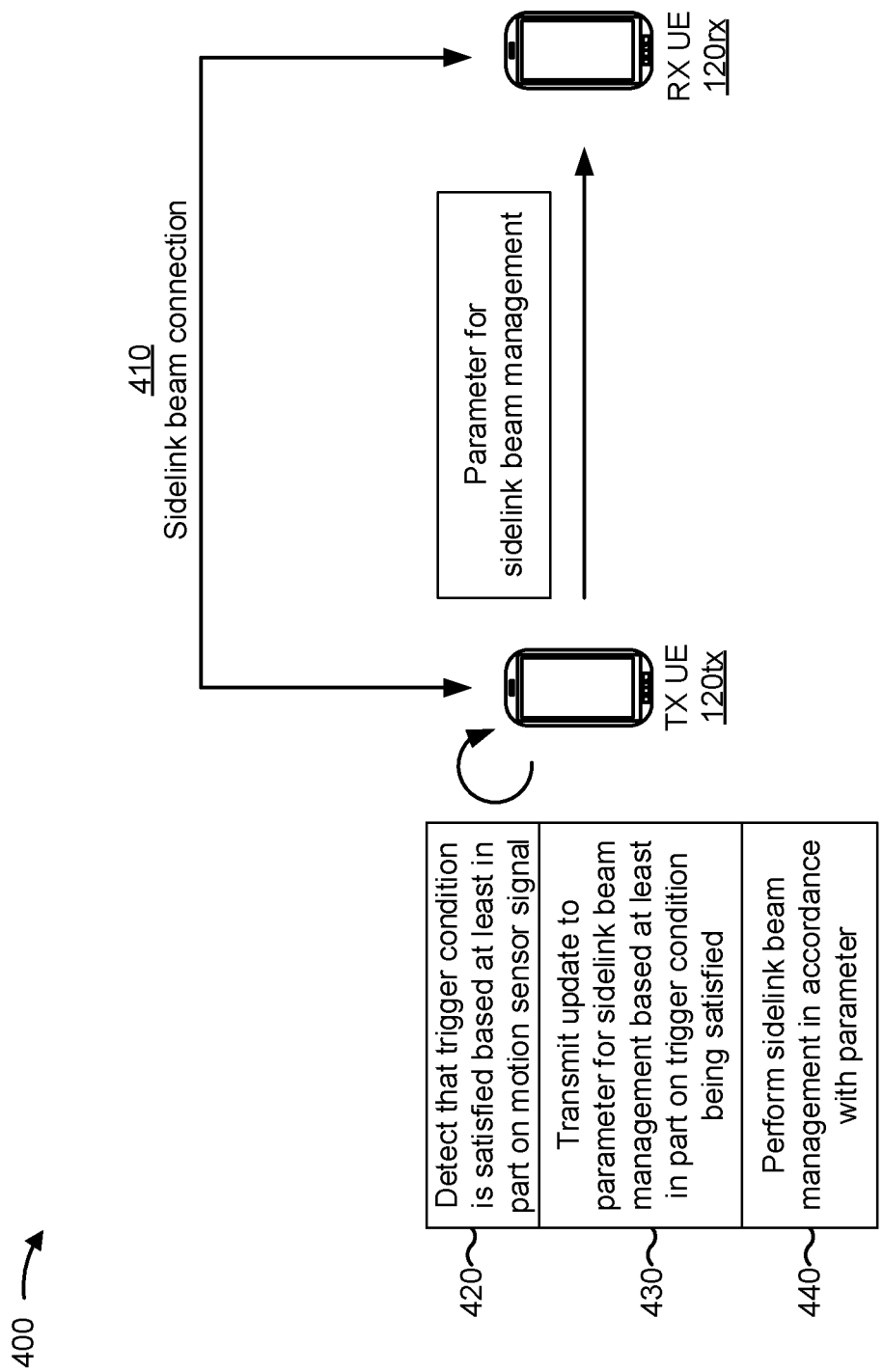
FIGS. 4-6 are diagrams illustrating examples of triggered QCL updates for sidelink beam management, in accordance with various aspects of the present disclosure.
Figure 5:
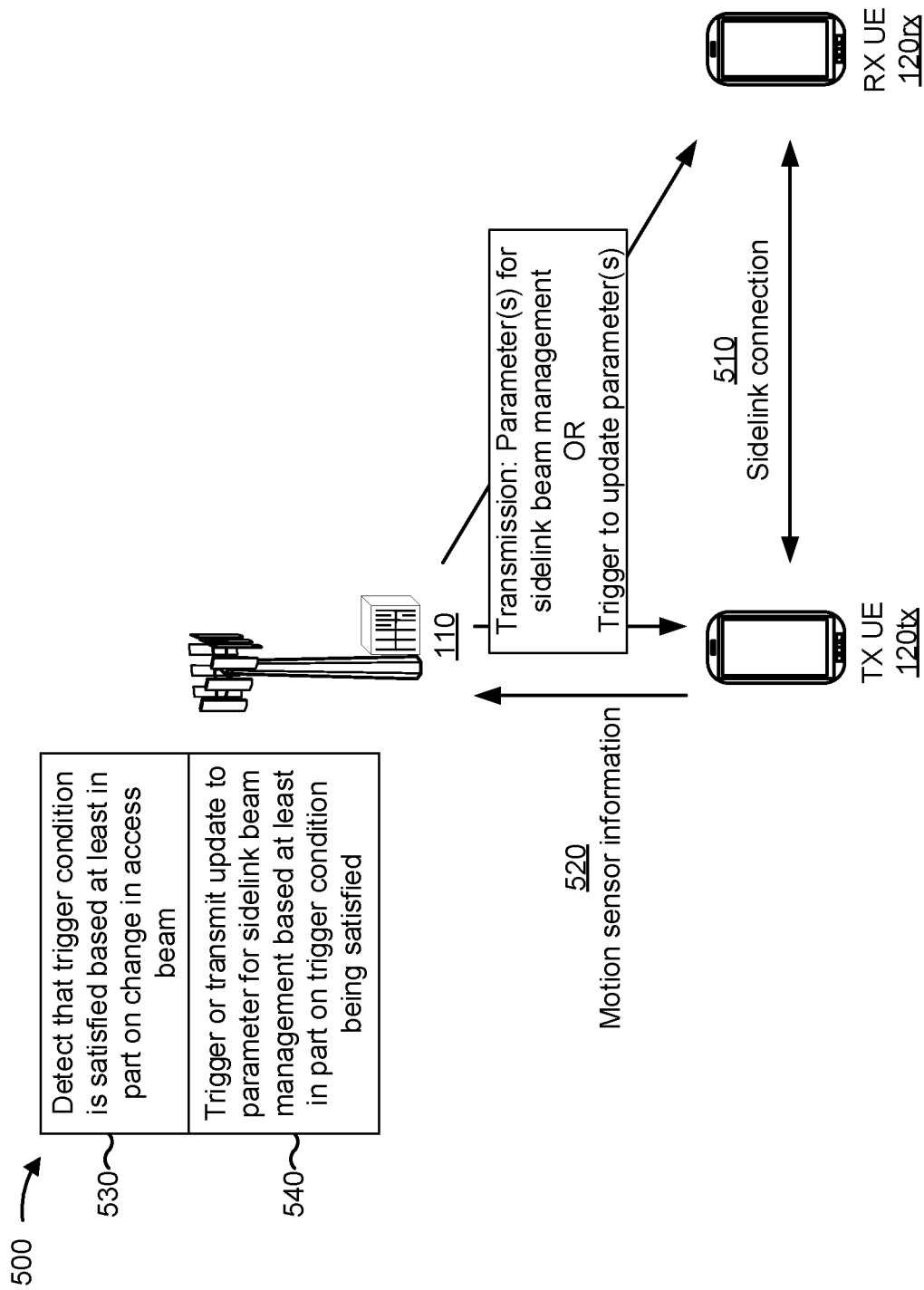
Figure 6:
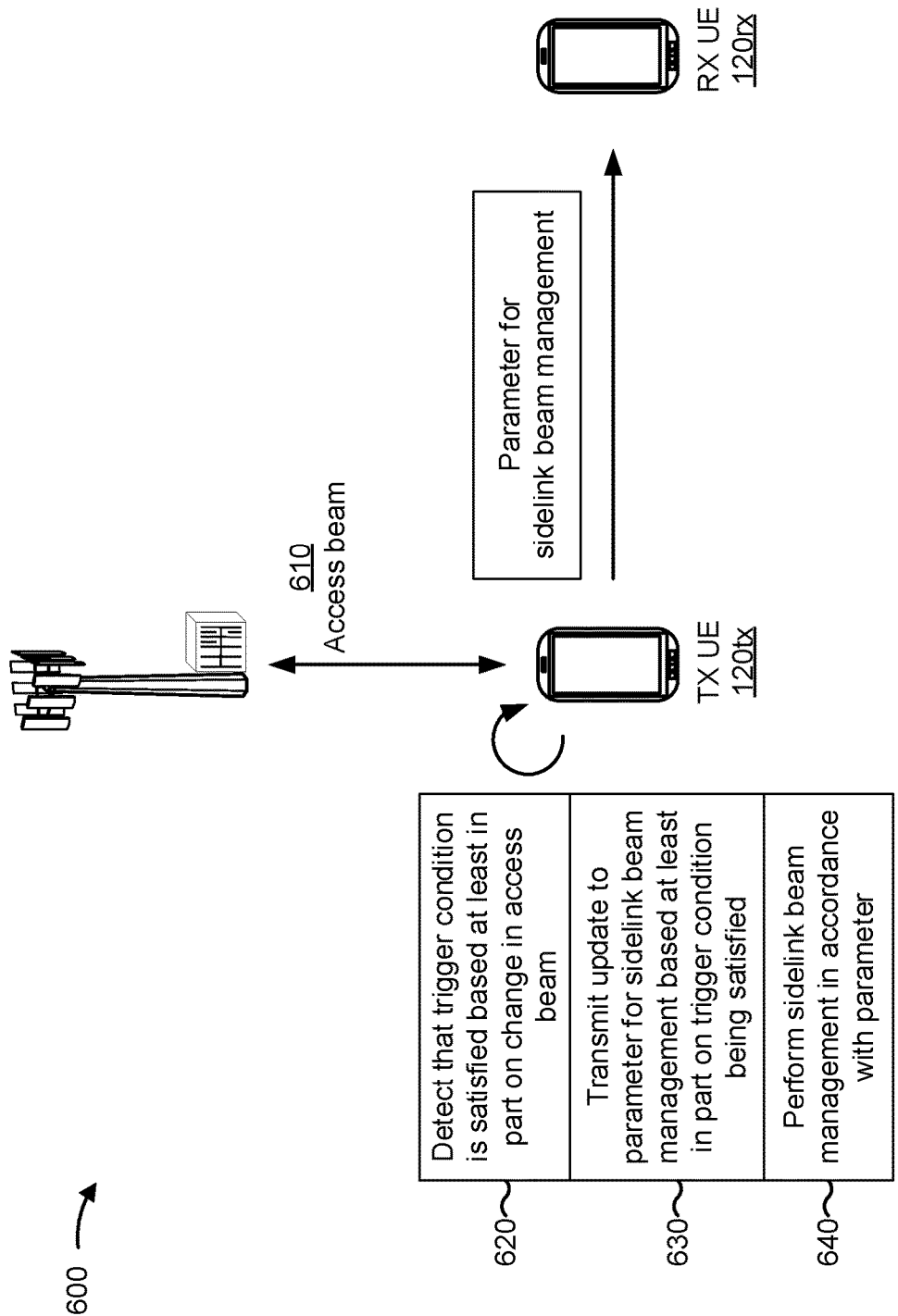

FIGS. 4-6 are diagrams illustrating examples 400, 500, and 600 of triggered QCL updates for sidelink beam management, in accordance with various aspects of the present disclosure. As shown, example 400 includes a TX UE 120tx and an RX UE 120rx. As shown by reference number 410, the TX UE 120tx and the RX UE 120rx are associated with a sidelink communication link. In some aspects, the TX UE 120tx and/or the RX UE 120rx may include wireless nodes, such as IAB relay nodes and/or the like.

As shown by reference number 420, the TX UE 120tx may detect that a trigger condition is satisfied. For example, the TX UE 120tx may determine that the trigger condition is satisfied based at least in part on a motion sensor signal of the TX UE 120tx, such as from a gyroscope, an accelerometer, a global positioning system (GPS) signal, and/or the like. In some aspects, the TX UE 120tx may determine that the trigger condition is satisfied based at least in part on geolocation information, such as from a GPS, a cellular geolocation service, and/or the like.

In some aspects, the trigger condition may be based at least in part on location information. As used herein, location information may include, for example, information identifying an orientation of the TX UE 120tx, a position of the TX UE 120tx, a speed of the TX UE 120tx, a rate of change of an orientation of the TX UE 120tx, a rate of change of speed of the TX UE 120tx, and/or the like. In some aspects, the trigger condition may be defined as one or more thresholds relating to one or more of the above types of information. For example, the trigger condition may be satisfied when the motion sensor signal indicates a threshold speed of the TX UE 120tx, a threshold change in orientation of the TX UE 120tx, and/or the like. In some aspects, the trigger condition may be based at least in part on a coverage area of a serving beam of the TX UE 120tx for the RX UE 120rx. For example, the trigger condition may indicate that the parameter is to be updated when a movement of the TX UE 120tx displaces the serving beam sufficiently that the RX UE 120rx would no longer be satisfactorily covered by the serving beam (e.g., where a parameter associated with beam misalignment between the TX UE 120tx and the RX UE 120rx satisfies a threshold).

As shown by reference number 430, the TX UE 120tx may transmit an update to a parameter for sidelink beam management based at least in part on the trigger condition being satisfied. For example, the TX UE 120tx may transmit the update to the RX UE 120rx, to other UEs 120, to a BS 110, and/or the like. In some aspects, the TX UE 120tx may transmit respective updates to each RX UE 120rx associated with the TX UE 120tx. The update to the parameter may identify one or more updated values of one or more parameters for sidelink beam management. In some aspects, the TX UE 120tx (or the BS 110) may transmit the update to the parameter using a media access control (MAC) control element (CE), a radio resource control (RRC) configuration message, an RRC reconfiguration message, a physical sidelink shared channel (PSSCH), a physical sidelink control channel (PSCCH), and/or the like.

In some aspects, the parameter may relate to a periodicity of the sidelink beam management. For example, for a TX UE 120tx moving or rotating relatively quickly, a shorter periodicity may provide better sidelink beam management performance than a longer periodicity. In some aspects, when the TX UE 120tx is moving or rotating relatively quickly, the periodicity may be adjusted to be shorter than a periodicity for the TX UE 120tx when it is moving or rotating relatively slowly.

In some aspects, the parameter may relate to a number of beams used in the sidelink beam management. For example, a slower-moving TX UE 120tx may use fewer beams for sidelink beam management than a faster-moving TX UE 120tx, thereby conserving resources of the slower-moving TX UE 120tx that would otherwise be used to transmit a larger number of beams for sidelink beam management.

In some aspects, the parameter may relate to a number of antenna panels or antenna arrays used in the sidelink beam management. For example, a larger number of antenna panels or antenna arrays may provide a larger number of potential beams, thereby improving performance of the sidelink beam management for fast-moving TX UEs 120tx. In some aspects, the parameter may relate to a transmission parameter for the sidelink beam management, such as a transmit power (e.g., a higher transmit power may be used for faster-moving UEs), a waveform, a number of repetitions (e.g., more repetitions may be used for faster-moving UEs), and/or the like.

In some aspects, the TX UE 120tx may determine the parameter based at least in part on an interference mitigation technique. For example, the TX UE 120tx may select a diminished transmit power, a diminished number of beams, a diminished number of repetitions, and/or the like, to reduce interference. Thus, the TX UE 120tx may reduce interference to other UEs 120 and a BS 110 that might be caused by the sidelink beam management synchronization signal.

As shown by reference number 440, the TX UE 120tx may perform sidelink beam management with the RX UE 120rx. For example, the TX UE 120tx may perform sidelink beam management (described in connection with FIG. 7) in accordance with the updated parameter(s) provided by the TX UE 120tx. Thus, the TX UE 120tx may update sidelink beam management parameters in connection with a trigger condition relating to mobility of the TX UE 120tx, thereby improving efficiency and performance of sidelink beam management in high-mobility scenarios.

FIG. 5 shows an example 500 wherein a BS 110 detects the trigger condition. As shown, example 500 includes a TX UE 120tx, an RX UE 120rx, and a BS 110. As shown by reference number 510, the TX UE 120tx and the RX UE 120rx are associated with a sidelink connection. The BS 110 may provide access links for the TX UE 120tx and the RX UE 120rx to a core network, a backhaul, and/or the like.

As shown by reference number 520, the TX UE 120tx may provide motion sensor information to the BS 110. In some aspects, the TX UE 120*tx* may provide the motion sensor information continuously, periodically, in connection with a request from the BS 110, and/or the like. In some aspects, the BS 110 may determine location information associated with the TX UE 120*tx*, for example, based at least in part on a beam management procedure between BS 110 and TX UE 120*tx* for an access link between the BS 110 and the TX UE 120*tx*. The motion sensor information may include or may be used to determine location information, as described in more detail above in connection with FIG. 4.

As shown by reference number 530, the BS 110 may determine that a trigger condition is satisfied based at least in part on the motion sensor information. The trigger condition is described in more detail above in connection with FIG. 4. Accordingly, as shown by reference number 540, the BS 110 may trigger or transmit (e.g., to TX UE 120*tx*, RX UE 120*rx*, both TX UE 120*tx* and RX UE(s) 120*rx*, and/or the like) an update to a parameter for sidelink beam management based at least in part on the trigger condition being satisfied. For example, the BS 110 may transmit, to TX UE 120*tx* and/or RX UE 120*rx*, updated parameters for sidelink beam management. In some aspects, the BS 110 may command TX UE 120*tx* and/or RX UE 120*rx* to update parameters for sidelink beam management appropriate to the trigger condition detected by the BS 110. For example, when triggering the update to the parameter, the BS 110 may determine that the trigger condition is satisfied, and may trigger the TX UE 120*tx* to update the parameter (e.g., to transmit information identifying the update to the parameter) based at least in part on the trigger condition being satisfied (e.g., by transmitting an indication that the trigger condition is satisfied). When transmitting the update to the parameter, the BS 110 may determine the update to the parameter, and may transmit information identifying the update to the parameter.

In some aspects, the BS 110 may determine the update to the parameter. For example, the BS 110 may determine a periodicity, a number of beams, a number of antennas, arrays, or panels to be used, and/or the like. In some aspects, the BS 110 may determine the periodicity to mitigate or reduce interference between sidelink UEs 120. For example, the BS 110 may select a number of beams, a transmit power, and/or the like, so that the sidelink beam management of TX UE 120*tx* and RX UE 120*rx* does not interfere with other UEs 120 of a sidelink network. In some aspects, the BS 110 may provide the update to the parameter to all devices of a sidelink network. For example, the BS 110 may provide the update to the parameter to all sidelink devices associated with a direct link with the TX UE 120*tx* and/or the RX UE 120*rx*, to all sidelink devices within X hops of TX UE 120*tx* or RX UE 120*rx*, to all sidelink devices that are associated with sidelink connections with TX UE 120*tx* or RX UE 120*rx*, to all devices that are included in the sidelink network, and/or the like. A sidelink network may be associated with a network identifier, and any device that is allowed to join the sidelink network may be included in the sidelink network. The BS 110, or a representative device of the sidelink network, may determine whether a given device is to join the sidelink network. Thus, interference to other UEs 120 by the sidelink network may be reduced. This may be particularly useful when many UEs 120 are covered by the BS 110.

FIG. 6 shows an example 600 wherein a TX UE 120*tx* (or a BS 110) updates a parameter for sidelink beam management based at least in part on a change in an access beam 610 between the TX UE 120*tx* and the BS 110.

As shown by reference number 620, the TX UE 120*tx* may determine that a trigger condition is satisfied based at least in part on a change in the access beam 610. For example, the TX UE 120*tx* may determine that a QCL state of the access beam 610 has changed, that a serving beam used for the access beam 610 has changed, that the BS 110 has assigned a new access beam 610, and/or the like. Since the BS 110 is stationary, a change in the access beam 610 may indicate that the TX UE 120*tx* is mobile and/or that the sidelink beam between the TX UE 120*tx* and the RX UE 120*rx* is likely to change due to the TX UE 120*tx*'s mobility.

As shown by reference number 630, the TX UE 120*tx* may transmit (e.g., to the BS 110, the RX UE 120*rx*, and/or to one or more other UEs 120) an update to a parameter for sidelink beam management based at least in part on the trigger condition being satisfied. This is described in more detail above in connection with FIG. 4. In some aspects, the TX UE 120*tx* may trigger an update to the parameter (e.g., by the BS 110), which is described in more detail above in connection with FIG. 5. In other words, when triggering the update to the parameter, the TX UE 120*tx* may provide an indication, to the BS 110, that the trigger condition is satisfied, and the BS 110 may transmit, to the TX UE 120*tx*, the RX UE 120*rx*, and/or one or more other UEs 120, the update to the parameter. When transmitting the update to the parameter, the TX UE 120*tx* may transmit the update to the parameter to the BS 110, the RX UE 120*rx*, and/or one or more other UEs 120.

As shown by reference number 640, the TX UE 120*tx* may perform sidelink beam management in accordance with the parameter, as described in more detail in connection with FIGS. 4 and 5. Thus, the TX UE 120*tx* may trigger an update to sidelink beam management based at least in part on a change to an access beam of the TX UE 120*tx*, which may conserve resources of the TX UE 120*tx* that would otherwise be used to monitor a motion sensor signal of the TX UE 120*tx*.

As indicated above, FIGS. 4-6 are provided as examples. Other examples may differ from what is described with respect to FIGS. 4-6.

Figure 7:
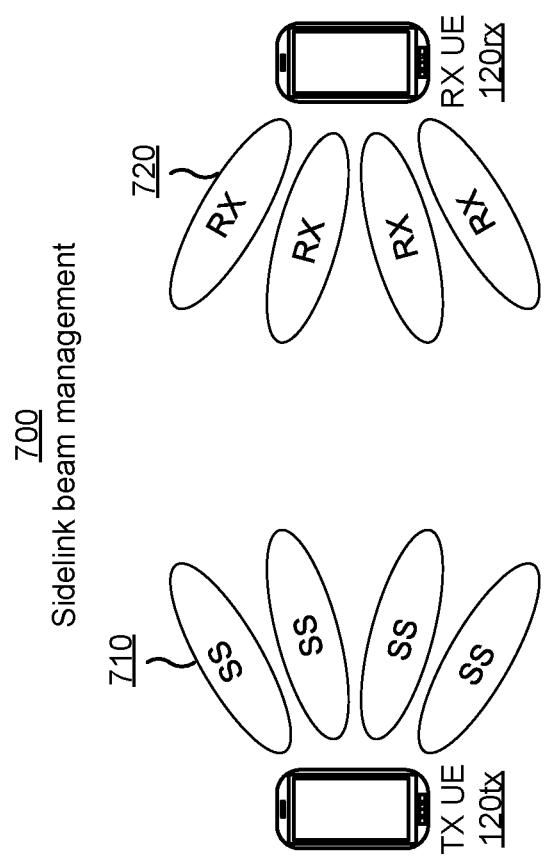
FIG. 7 is a diagram illustrating an example of sidelink beam management, in accordance with various aspects of the present disclosure.

FIG. 7 is a diagram illustrating an example 700 of sidelink beam management (also referred to herein as QCL updating), in accordance with various aspects of the present disclosure. As shown, FIG. 7 includes a TX UE 120*tx* and an RX UE 120*rx*. As shown by reference number 710, the TX UE 120*tx* may generate synchronization signals (SS) on a variety of transmit beams. For example, the TX UE 120*tx* may sweep the transmit beams, and may transmit the SS on each transmit beam of the transmit beams. The number of transmit beams, the waveform of the SS, the spacing of transmit beams, the transmit power of the transmit beams, and the antennas/panels/arrays used to generate the transmit beams may be specified by the parameters of the sidelink beam management. Each transmit beam may be associated with a respective QCL state or QCL type.

As shown by reference number 720, the RX UE 120*rx* may generate a variety of receive (RX) beams, each associated with a respective QCL state or QCL type. The RX UE 120*rx* may determine performance of each receive beam relative to one or more of the SSs transmitted by the TX UE 120*tx* (e.g., all of the SSs, a best SS, a best N SSs, and/or the like). The RX UE 120*rx* may feed back information indicating a best transmit beam of the TX UE 120*tx*, and may select a best receive beam for the RX UE 120*rx*. The number of receive beams, the spacing of receive beams, and the antennas/panels/arrays used to generate the receive beams may be specified by the parameters of the sidelink beam management.

As indicated above, FIG. 7 is provided as an example. Other examples may differ from what is described with respect to FIG. 7.

Figure 8:
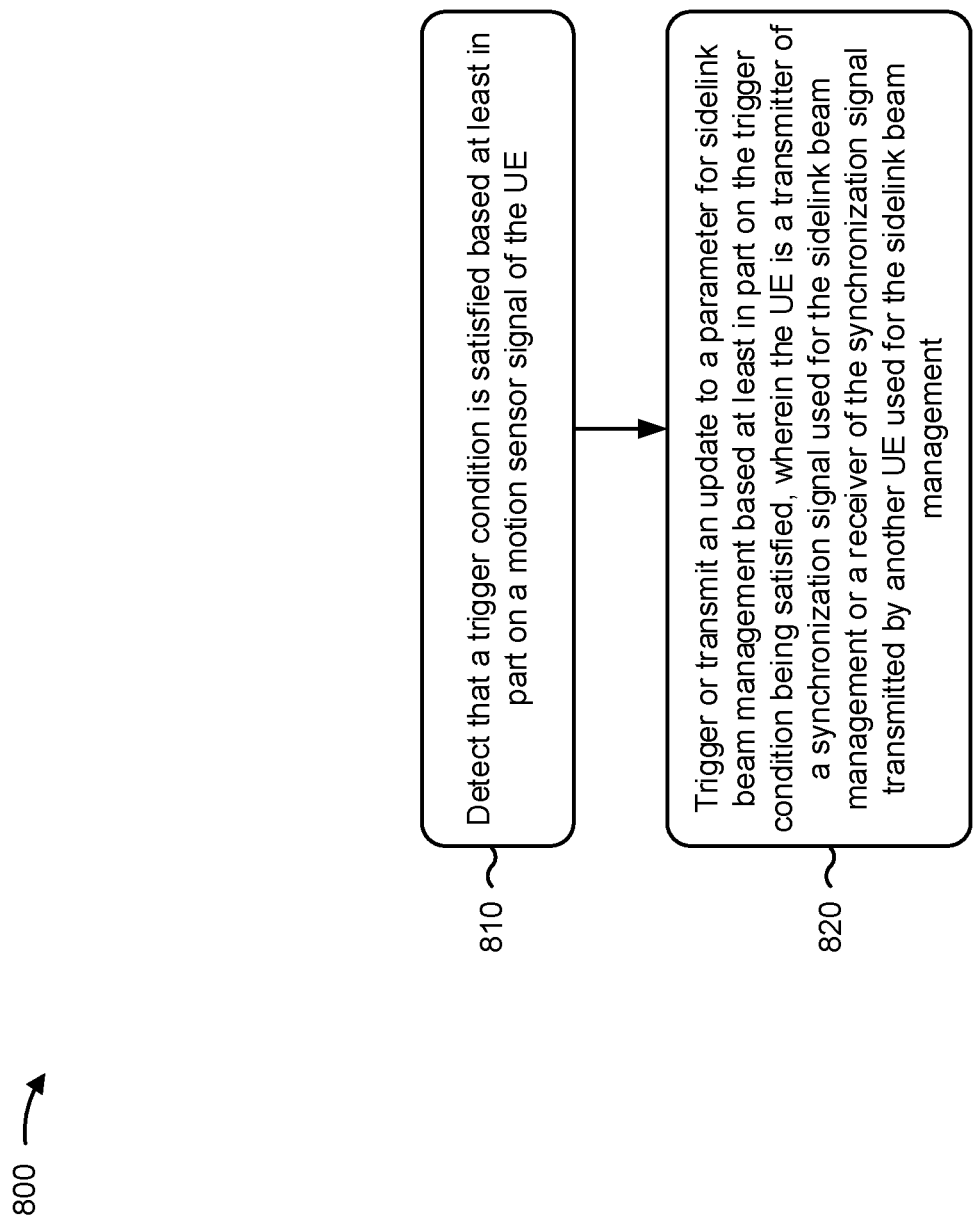
FIG. 8 is a diagram illustrating an example process performed, for example, by a user equipment, in accordance with various aspects of the present disclosure.

FIG. 8 is a diagram illustrating an example process 800 performed, for example, by a user equipment, in accordance with various aspects of the present disclosure. Example process 800 is an example where a UE (e.g., TX UE 120$tx$ and/or the like) performs operations associated with a triggered sidelink quasi-colocation parameter update.

As shown in FIG. 8, in some aspects, process 800 may include detecting that a trigger condition is satisfied based at least in part on a motion sensor signal of the UE (block 810). For example, the UE (e.g., using controller/processor 280 and/or the like) may detect that a trigger condition is satisfied based at least in part on a motion sensor signal of the UE, as described above.

As further shown in FIG. 8, in some aspects, process 800 may include triggering or transmitting an update to a parameter for sidelink beam management based at least in part on the trigger condition being satisfied, wherein the UE is a transmitter of a synchronization signal used for the sidelink beam management or a receiver of the synchronization signal transmitted by another UE used for the sidelink beam management (block 820). For example, the user equipment (e.g., using receive processor 258, transmit processor 264, controller/processor 280, memory 282, and/or the like) may trigger or transmit an update to a parameter for sidelink beam management based at least in part on the trigger condition being satisfied, as described above. In some aspects, the UE is a transmitter of a synchronization signal used for the sidelink beam management. In some aspects, the UE is a receiver of the synchronization signal transmitted by another UE used for the sidelink beam management.

Process 800 may include additional aspects, such as any single aspect or any combination of aspects described below and/or in connection with one or more other processes described elsewhere herein.

In a first aspect, the trigger condition is based at least in part on a threshold relating to at least one of an orientation of the UE, a position of the UE, or a speed of the UE.

In a second aspect, alone or in combination with the first aspect, triggering or transmitting the update to the parameter for the sidelink beam management further comprises transmitting location information to a base station to trigger the update to the parameter for the sidelink beam management.

In a third aspect, alone or in combination with one or more of the first and second aspects, the trigger condition is satisfied based at least in part on a change in a quasi-colocation state of an access link between the UE and a base station.

In a fourth aspect, alone or in combination with one or more of the first through third aspects, triggering or transmitting an update to a parameter for sidelink beam management based at least in part on the trigger condition being satisfied further comprises transmitting the update to the parameter to one or more other UEs associated with a sidelink connection with the UE.

In a fifth aspect, alone or in combination with one or more of the first through fourth aspects, the update to the parameter is transmitted using at least one of a media access control (MAC) control element (CE) or a radio resource control (RRC) reconfiguration message.

In a sixth aspect, alone or in combination with one or more of the first through fifth aspects, the parameter relates to at least one of a periodicity of the sidelink beam management, a number of beams used in the sidelink beam management, a number of antenna panels used in the sidelink beam management, a number of antenna arrays used in the sidelink beam management, or a transmission parameter for the sidelink beam management.

In a seventh aspect, alone or in combination with one or more of the first through sixth aspects, the sidelink beam management is performed to determine a spatial parameter for sidelink beam communication between the UE and the other UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a base station, in accordance with various aspects of the present disclosure. Example process 900 is an example where a base station (e.g., base station 110 and/or the like) performs operations associated with a triggered sidelink quasi-colocation parameter update.

As shown in FIG. 9, in some aspects, process 900 may include detecting that a trigger condition is satisfied based at least in part on a motion sensor signal of a user equipment (UE) (block 910). For example, the base station (e.g., using transmit processor 220, receive processor 238, controller/processor 240, memory 242, and/or the like) may detect that a trigger condition is satisfied based at least in part on a motion sensor signal of a UE, as described above.

As further shown in FIG. 9, in some aspects, process 900 may include triggering or transmitting an update to a parameter for sidelink beam management based at least in part on the trigger condition being satisfied, wherein the UE is a transmitter of a synchronization signal used for the sidelink beam management or a receiver of the synchronization signal transmitted by another UE used for the sidelink beam management (block 920). For example, the base station (e.g., using transmit processor 220, receive processor 238, controller/processor 240, memory 242, and/or the like) may transmit an update to a parameter for sidelink beam management based at least in part on the trigger condition being satisfied, as described above. In some aspects, the UE is a transmitter of a synchronization signal used for the sidelink beam management. In some aspects, the UE is a receiver of the synchronization signal transmitted by another UE used for the sidelink beam management.

Process 900 may include additional aspects, such as any single aspect or any combination of aspects described below and/or in connection with one or more other processes described elsewhere herein.

In a first aspect, the trigger condition is based at least in part on a threshold relating to at least one of a position of the UE, an orientation of the UE, or a speed of the UE.

In a second aspect, alone or in combination with the first aspect, detecting that the trigger condition is satisfied is based at least in part on location information, received from the UE, that is determined based at least in part on the motion sensor signal.

In a third aspect, alone or in combination with one or more of the first and second aspects, the trigger condition is satisfied based at least in part on a change in a quasi-colocation state of an access link between the UE and the base station.

In a fourth aspect, alone or in combination with one or more of the first through third aspects, transmitting the update to the parameter for sidelink beam management based at least in part on the trigger condition being satisfied further comprises transmitting the update to the parameter to one or more other UEs associated with a sidelink connection with the UE.

In a fifth aspect, alone or in combination with one or more of the first through fourth aspects, the update to the parameter is transmitted to all devices associated with a sidelink network of the UE.

In a sixth aspect, alone or in combination with one or more of the first through fifth aspects, the update to the parameter is transmitted using at least one of a MAC CE or an RRC reconfiguration message.

In a seventh aspect, alone or in combination with one or more of the first through sixth aspects, the parameter relates to at least one of: a periodicity of the sidelink beam management, a number of beams used in the sidelink beam management, a number of antenna panels used in the sidelink beam management, a number of antenna arrays used in the sidelink beam management, or a transmission parameter for the sidelink beam management.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   detecting that a trigger condition is satisfied based at least in part on a motion sensor signal of the UE; and
   transmitting an update to a parameter for sidelink beam management to one or more other UEs associated with a sidelink connection with the UE based at least in part on the trigger condition being satisfied, wherein the UE is:
   a transmitter of a synchronization signal used for the sidelink beam management, or
   a receiver of the synchronization signal transmitted by another UE, of the one or more other UEs, used for the sidelink beam management.

2. The method of claim 1, wherein the trigger condition is based at least in part on a threshold relating to at least one of:
   an orientation of the UE, or
   a position of the UE,
   a speed of the UE.

3. The method of claim 1, further comprising:
   transmitting location information to a base station to trigger the update to the parameter for the sidelink beam management.

4. The method of claim 1, wherein the trigger condition is satisfied based at least in part on a change in a quasi-colocation state of an access link between the UE and a base station.

5. The method of claim 1, wherein the update to the parameter is transmitted using at least one of a media access control (MAC) control element (CE) or a radio resource control (RRC) reconfiguration message.

6. The method of claim 1, wherein the parameter relates to at least one of:
   a periodicity of the sidelink beam management,
   a number of beams used in the sidelink beam management,
   a number of antenna panels used in the sidelink beam management,
   a number of antenna arrays used in the sidelink beam management, or
   a transmission parameter for the sidelink beam management.

7. The method of claim 1, wherein the sidelink beam management is performed to determine a spatial parameter for sidelink beam communication between the UE and the other UE.

8. The method of claim 1, wherein the parameter is associated with a best beam of a plurality of beams used in the sidelink beam management, and wherein each beam, of the plurality of beams, is associated with a different synchronization signal of a plurality of synchronization signals including the synchronization signal.

9. A method of wireless communication performed by a base station, comprising:

detecting that a trigger condition is satisfied based at least in part on a motion sensor signal of a user equipment (UE); and transmitting an update to a parameter for sidelink beam management to one or more other UEs associated with a sidelink connection with the UE based at least in part on the trigger condition being satisfied, wherein the UE is:

a transmitter of a synchronization signal used for the sidelink beam management, or a receiver of the synchronization signal used for the sidelink beam management.

10. The method of claim 9, wherein the trigger condition is based at least in part on a threshold relating to at least one of:

a position of the UE,
an orientation of the UE, or
a speed of the UE.

11. The method of claim 9, wherein detecting that the trigger condition is satisfied is based at least in part on location information, received from the UE, that is determined based at least in part on the motion sensor signal.

12. The method of claim 9, wherein the trigger condition is satisfied based at least in part on a change in a quasi-colocation state of an access link between the UE and the base station.

13. The method of claim 9, wherein the update to the parameter is transmitted to all devices associated with a sidelink network of the UE.

14. The method of claim 9, wherein the update to the parameter is transmitted using at least one of a media access control (MAC) control element (CE) or a radio resource control (RRC) reconfiguration message.

15. The method of claim 9, wherein the parameter relates to at least one of:

a periodicity of the sidelink beam management,
a number of beams used in the sidelink beam management,
a number of antenna panels used in the sidelink beam management,
a number of antenna arrays used in the sidelink beam management, or
a transmission parameter for the sidelink beam management.

16. The method of claim 9, wherein the parameter is associated with a best beam of a plurality of beams used in the sidelink beam management, and wherein each beam, of the plurality of beams, is associated with a different synchronization signal of a plurality of synchronization signals including the synchronization signal.

17. A user equipment (UE) for wireless communication, comprising:

a memory; and
one or more processors coupled to the memory, the memory and the one or more processors configured to:
detect that a trigger condition is satisfied based at least in part on a motion sensor signal of the UE; and transmit an update to a parameter for sidelink beam management to one or more other UEs associated with a sidelink connection with the UE based at least in part on the trigger condition being satisfied, wherein the UE is:

a transmitter of a synchronization signal used for the sidelink beam management, or a receiver of the synchronization signal transmitted by another UE, of the one or more other UEs, used for the sidelink beam management.

18. The UE of claim 17, wherein the trigger condition is based at least in part on a threshold relating to at least one of:

an orientation of the UE, or
a position of the UE,
a speed of the UE.

19. The UE of claim 17, wherein the memory and the one or more processors are further configured to:

transmit location information to a base station to trigger the update to the parameter for the sidelink beam management.

20. The UE of claim 17, wherein the trigger condition is satisfied based at least in part on a change in a quasi-colocation state of an access link between the UE and a base station.

21. The UE of claim 17, wherein the parameter relates to at least one of:

a periodicity of the sidelink beam management,
a number of beams used in the sidelink beam management,
a number of antenna panels used in the sidelink beam management,
a number of antenna arrays used in the sidelink beam management, or
a transmission parameter for the sidelink beam management.

22. The UE of claim 17, wherein the sidelink beam management is performed to determine a spatial parameter for sidelink beam communication between the UE and the other UE.

23. The UE of claim 17, wherein the parameter is associated with a best beam of a plurality of beams used in the sidelink beam management, and wherein each beam, of the plurality of beams, is associated with a different synchronization signal of a plurality of synchronization signals including the synchronization signal.

24. A base station for wireless communication, comprising:

a memory; and
one or more processors coupled to the memory, the memory and the one or more processors configured to:
detect that a trigger condition is satisfied based at least in part on a motion sensor signal of a user equipment (UE); and
transmit an update to a parameter for sidelink beam management to one or more other UEs associated with a sidelink connection with the UE based at least in part on the trigger condition being satisfied, wherein the UE is:
a transmitter of a synchronization signal used for the sidelink beam management, or
a receiver of the synchronization signal used for the sidelink beam management.

25. The base station of claim 24, wherein the trigger condition is based at least in part on a threshold relating to at least one of:

a position of the UE,
an orientation of the UE, or
a speed of the UE.

26. The base station of claim 24, wherein detecting that the trigger condition is satisfied is based at least in part on location information, received from the UE, that is determined based at least in part on the motion sensor signal.

27. The base station of claim 24, wherein the trigger condition is satisfied based at least in part on a change in a quasi-colocation state of an access link between the UE and the base station.

28. The base station of claim 24, wherein the update to the parameter is transmitted to all devices associated with a sidelink network of the UE.

29. The base station of claim 24, wherein the parameter relates to at least one of:
- a periodicity of the sidelink beam management,
- a number of beams used in the sidelink beam management,
- a number of antenna panels used in the sidelink beam management,
- a number of antenna arrays used in the sidelink beam management, or
- a transmission parameter for the sidelink beam management.

30. The base station of claim 24, wherein the parameter is associated with a best beam of a plurality of beams used in the sidelink beam management, and wherein each beam, of the plurality of beams, is associated with a different synchronization signal of a plurality of synchronization signals including the synchronization signal.

* * * * *